(12) United States Patent
Jönsson et al.

(10) Patent No.: US 10,617,578 B2
(45) Date of Patent: Apr. 14, 2020

(54) BRAKE ASSISTANCE SYSTEM FOR PATIENT HANDLING EQUIPMENT

(71) Applicant: ArjoHuntleigh AB, Malmo (SE)

(72) Inventors: Jörgen Jönsson, Harlosa (SE); Musadjan Alim, Lund (SE); Danny Smith, Lund (SE); Ulf Holmberg, Halmstad (SE); Daniel Petersson, Halmstad (SE)

(73) Assignee: ArjoHuntleigh AB, Malmo (SE)

( * ) Notice: Subject to any disclaimer, the term of this patent is extended or adjusted under 35 U.S.C. 154(b) by 0 days.

(21) Appl. No.: 15/740,445

(22) PCT Filed: Jun. 29, 2016

(86) PCT No.: PCT/EP2016/065173
§ 371 (c)(1),
(2) Date: Dec. 28, 2017

(87) PCT Pub. No.: WO2017/001497
PCT Pub. Date: Jan. 5, 2017

(65) Prior Publication Data
US 2018/0185208 A1 Jul. 5, 2018

(30) Foreign Application Priority Data
Jun. 29, 2015 (EP) .................................... 15174315

(51) Int. Cl.
*A61G 1/02* (2006.01)
*A61G 7/05* (2006.01)
*B60B 33/00* (2006.01)

(52) U.S. Cl.
CPC ......... *A61G 1/0287* (2013.01); *A61G 1/0275* (2013.01); *A61G 7/0528* (2016.11); *B60B 33/0094* (2013.01)

(58) Field of Classification Search
None
See application file for complete search history.

(56) References Cited

U.S. PATENT DOCUMENTS 2,591,082 A * 4/1952 Lynch ...................... A61G 7/00
297/DIG. 4
5,903,940 A * 5/1999 Volker ................. A47C 19/045
5/600
6,725,956 B1 4/2004 Lemire
(Continued)

FOREIGN PATENT DOCUMENTS

AU 2007216572 B2 8/2007
DE 102006007377 A1 8/2007
(Continued)

*Primary Examiner* — Richard M Camby
(74) *Attorney, Agent, or Firm* — The Webb Law Firm

(57) ABSTRACT

A brake assist system for patient handling equipment such as a patient bed includes a drive wheel. The wheel includes a brake assist system operated by control of a controlled unit which is operable to sense tilt of the handling equipment and to apply partial breaking to the wheel when it is detected that the equipment is on a slope. The control unit controls a maximum speed of the equipment down the slope, in order to protect the patient and to assist a care worker. The control unit disengages the brake assist mechanism when it is detected that the equipment is on a horizontal surface.

27 Claims, 5 Drawing Sheets

(56) References Cited

U.S. PATENT DOCUMENTS

| | | | |
|---|---|---|---|
| 6,749,034 B2 | 6/2004 | Vogel et al. | |
| 6,752,224 B2 | 6/2004 | Hopper et al. | |
| 7,191,854 B2 | 3/2007 | Lenkman | |
| 7,311,161 B2 | 12/2007 | Lee | |
| 7,419,019 B1 | 9/2008 | White et al. | |
| 8,109,525 B2 | 2/2012 | Salus | |
| 8,267,206 B2 | 9/2012 | Vogel et al. | |
| 2010/0181122 A1 | 7/2010 | Block et al. | |
| 2016/0137216 A1* | 5/2016 | Nilsson | A61G 7/08 180/19.1 |
| 2016/0143796 A1* | 5/2016 | Jordan | A61G 1/0275 701/70 |

FOREIGN PATENT DOCUMENTS

| | | | |
|---|---|---|---|
| EP | 1824435 B1 | 8/2007 |
| WO | 2011144186 A2 | 11/2011 |
| WO | 2014187864 A1 | 11/2014 |
| WO | 2015021950 A1 | 2/2015 |

* cited by examiner

BRAKE ASSISTANCE SYSTEM FOR PATIENT HANDLING EQUIPMENT

CROSS-REFERENCE TO RELATED APPLICATIONS

This application is the United States national phase of International Application No. PCT/EP2016/065173 filed Jun. 29, 2016, and claims priority to European Patent Application No. 15174315.0 filed Jun. 29, 2015, the disclosures of which are hereby incorporated in their entirety by reference.

BACKGROUND OF THE INVENTION

Field of the Invention

This disclosure relates to a brake assistance system for a patient handling equipment (powered or not) such as a medical bed, trolley/stretcher, patient lift, surgical table and other medical equipment incorporating a brake assistance system. In one embodiment the brake assistance system is incorporated into and/or operatively associated with a wheel system of the patient handling equipment.

Description of Related Art

Mobile patient handling equipment relies on castors having low rolling resistance, both in their direction of movement and in their ability to change direction, that is to swivel. This gives the patient handling equipment favorable abilities such as lowering the force it takes to move the patient handling equipment and its payload from one location to another.

When operating such equipment along non-flat surfaces, such as down or up slopes, the user has to be prepared for the eventuality of slipping, tripping or otherwise losing control of the equipment and the potential consequences. The low rolling resistance favorable while travelling along horizontal surfaces may be a disadvantage on any downward slope as the equipment may accelerate to a fairly high speed.

Power assisted propulsion and braking systems for patient handling equipment such as beds or stretchers, such as that of U.S. Pat. No. 6,752,224 have manual braking systems and/or electronic systems that prevent movement of the bed when a brake position sensor is turned on. While such motorized propulsion systems can provide user assistance in moving a bed up slopes or over uneven surfaces, the user has no means for decelerating or slowing the movement of a bed or stretcher other than by manually applying the brake pedals and/or forcibly pulling/pushing on the bed or stretcher in a direction opposite of its trajectory/velocity.

SUMMARY OF THE INVENTION

The present disclosure seeks to provide improved mobile equipment, primarily for medical uses, and an improved brake assistance system for patient handling equipment such as a medical bed or trolley.

The exemplary embodiments described herein seek to provide a system which is simple to use and which preferably works in the background and automatically assists the user on slopes.

The exemplary embodiments can provide a system that can be applied to all wheeled equipment regardless of whether they are powered or not.

According to an aspect of the present disclosure, there is provided a mobile equipment including a brake assist apparatus. The brake assist apparatus may include at least one wheel unit, at least one brake element associated with the at least one wheel unit, a control unit coupled to the brake element, and a tilt sensor connected to the control unit and operable to detect tilt of the mobile equipment. The control unit may be configured to engage the at least one brake element in a partial braking mode when the tilt sensor senses the mobile equipment is on a slope, wherein the partial braking mode allows the mobile equipment to move down the slope.

In accordance with another aspect of the present disclosure, a brake assist system for mobile patient handling equipment may include at least one wheel, at least one brake operatively associated with the wheel, at least one sensor for detecting a status of the mobile patient handling equipment and a control unit operatively associated with the sensor and the brake. The control unit may be configured to engage the at least one brake in a partial braking mode when the patient handling equipment: is moving down a slope, exceeds a predetermined velocity, and/or exceeds a predetermined acceleration. The partial braking mode allows the mobile patient handling equipment to continue moving.

In accordance with another exemplary embodiment, the disclosure is directed to a method for using a brake assist system that involves detecting via sensors of the patient handling equipment a change in an angle of inclination of a surface supporting the patient handling equipment.

In accordance with another embodiment, another method for using a brake assist system of a patient handling equipment may involve automatically applying a braking force via a control system of the patient handling equipment when the patient handling equipment detects it is traveling down an incline and when: a change in acceleration or deceleration of the patient handling equipment is within or exceeds a predetermined range and/or a detected velocity of the patient handling equipment is within or exceeds a predetermined range.

The exemplary embodiments described herein are able to provide brake assistance to, for example, a patient trolley or bed, which operates only when it is detected that the equipment is located on a slope and travelling down said slope. The system thus allows the equipment to move down the slope but at a controlled speed. The controlled and reduced speed of the bed when moving down slope facilitates movement and equipment control and ensures that the care giver is made aware that the brakes of the equipment need to be applied if the care giver wants to halt the equipment. Furthermore, the system does not inhibit or restrict movement of the equipment when moving up slope, thus facilitating use. The exemplary system operates automatically to apply braking function when the conditions are appropriate, without the user needing to command any operation of the device.

Advantageously, the control unit is configured to engage the at least one brake element in cyclical manner to effect the partial braking mode. In one embodiment, the control unit is configured to adjust a duty cycle of the partial braking mode so as to adjust the amount of braking applied to the mobile equipment. In some examples, the control unit is configured to adjust a duration of the partial braking mode so as to adjust the amount of braking applied to the mobile equipment. These arrangements allow for adaptive control of the braking function, dependent upon circumstances such as load carried, slope of the incline, for example. Advantageously, the adaptive braking may be carried out automatically without specific user input. In some embodiments the user may also override or implement the adaptive braking upon command.

In one embodiment, the mobile equipment includes a speed sensor connected to the control unit, wherein the control unit is configured to adjust the partial braking mode on the basis of sensed speed. For example, the control unit may be configured to adjust the partial braking mode so as to limit the speed of the mobile equipment. Speed can be controlled to a preset maximum desired speed or, in other embodiments, to a maximum speed desired by the care giver, determined for example through a suitable control input.

In one embodiment, the wheel unit includes a fixed angle steering or braking wheel. This may be the 5th wheel of a trolley or bed.

The wheel unit may include a motorized or drive wheel, the brake element advantageously altering the driving function of the driven wheel. The drive wheel may in addition to providing propulsion assistance, particularly for moving the equipment up slopes, also provide a useful way of controlling braking function by controlling the power to the motor or by directly controlling/applying braking directly to the motor, typically via the drive wheel.

In one embodiment, the brake element includes a switchable bypass circuit connected across a drive motor of the wheel unit, the control unit being operable to control switching of the bypass circuit, wherein the bypass circuit is operable to reduce current flow to the drive motor. The switchable bypass circuit advantageously includes a low resistance bypass path.

In another embodiment, the brake element includes one or more brake pads operable by the control unit, wherein one or more or each brake pad is controllable so as to apply an adjustable braking force on the drive wheel.

In another embodiment, the brake element includes a hydraulic brake device coupled to the drive wheel and to the control unit, the control unit being operable to adjust the amount of hydraulic braking applied to the drive wheel.

In another embodiment, the tilt sensor may be a pendulum sensor, connected to the mobile equipment. In other embodiments it may be a fluidic sensor providing a series of tilt angle indicators. In yet another embodiment, the tilt sensor is a MEMS type accelerometer. Other embodiments could be incorporating a MEMS gyroscope by which the angle could be integrated from, a combination of an accelerometer reading and a gyro reading could advantageously be used to give a quick response that is yet stable over integrating the two readings in what's commonly known as Kalman Filtering or Complimentary Filtering.

In an exemplary embodiment, the mobile equipment is a medical device, such as a patient handling device. For example, the mobile equipment may be a medical bed, trolley or patient lift.

Other features and advantages of the teachings herein are set out in the specific description which follows.

BRIEF DESCRIPTION OF THE DRAWINGS

Embodiments of the present disclosure are described below, by way of example only, with reference to the accompanying drawings, in which.

DESCRIPTION OF EXEMPLARY EMBODIMENTS

Figure 1A:
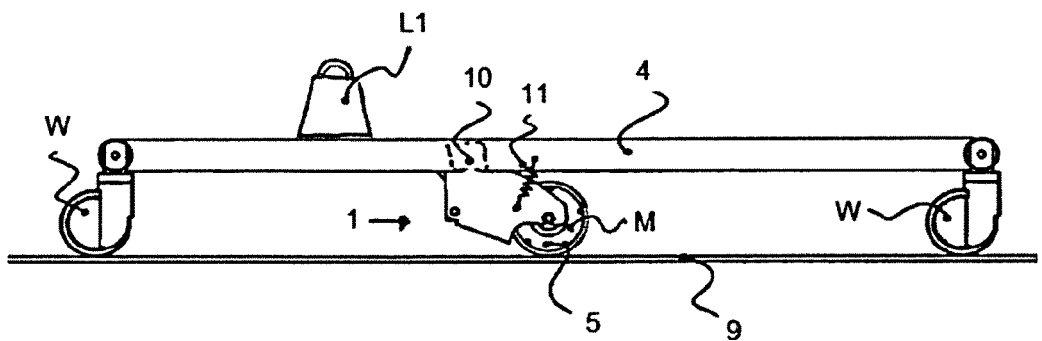
FIG. 1A is a side view of an exemplary embodiment of a patient trolley incorporating an exemplary brake assist system as taught herein.

In the field of mobile patient handling equipment such as beds, trolleys and patient lifts it is known to utilize a 5th wheel for steering and/or propulsion. Such systems most often rely on an input signal in the form of a user controlled throttle, a load cell sensing the amount of force applied by the user or a simple push button, all commanding the system to propel the equipment in a given direction. Other systems exist which rely on user input in the form of active brake force; for example, a system including a lever coupled via a wire to a brake arrangement to control speed, often referred to as a rollator. Both these type of system require the user to be an active part in the control loop. If the user fails to control the device, the system comes either to an abrupt halt or runs away from the user.

The systems disclosed herein addresses the aforementioned deficiencies and enable patient handling equipment to travel at a controlled and regulated speed down slopes, taking strain off a care giver, who otherwise would be manually trying to forcibly reduce the speed of the patient handling equipment, which can be quite strenuous if the payload is high.

The described embodiments are able to be implemented in a variety of patient handling equipment, such as beds, trolleys, patient lifts, surgical tables, chairs, whether powered by batteries or not, in order to assist a user in manoeuvring the equipment up or down slopes without requiring any additional control by the user. As a result, the user may give full attention to the task to be performed, while being assured the equipment will not run away.

The described embodiments allow the user to change speed down a slope, within certain limits. Thus, a care giver need not continuously monitor or forcibly maintain the patient equipment at a set speed and need not be bound to dedicated drive constraints. In the described embodiments there are provided one or more motorised wheel(s) together with one or more sensors for controlling the brake assistance, such as angle or tilt measurement and/or detection devices which communicate slope information to the system, gyroscopes or other sensors capable of detecting and communicating orientation and/or velocity. The operation of the brake assistance system can be performed automatically without any need for a user control interface. Whereas most patient handling equipment with powered propulsion requires the user to interact via buttons, throttles, trigger handles, joysticks or combinations of such input devices, in the present system once the breaking assistance system is activated it is automatically implemented as a user pushes, pulls and maneuvers a patient handling equipment as one would ordinarily to move the patient handling equipment without having to interface with any controls.

Optionally, the system may provide an additional second layer of safety to the mobile equipment without replacing safety measures already in place. In exemplary embodiments, in order to come to a standstill on a slope, the user needs to apply the ordinary parking brake system to the equipment as the automatic brake assist system is designed not hold the equipment halted on a slope but intentionally allows slow movement down the slope in order to warn the user to take the measures needed to lock the equipment in place, that is as long as the equipment is provided with a brake.

Such a system, which automatically detects slopes and brakes the system to a safe speed would be beneficial to a care giver, and can be achieved with or without battery powered drive equipment or even with a flat battery.

Figure 1B:
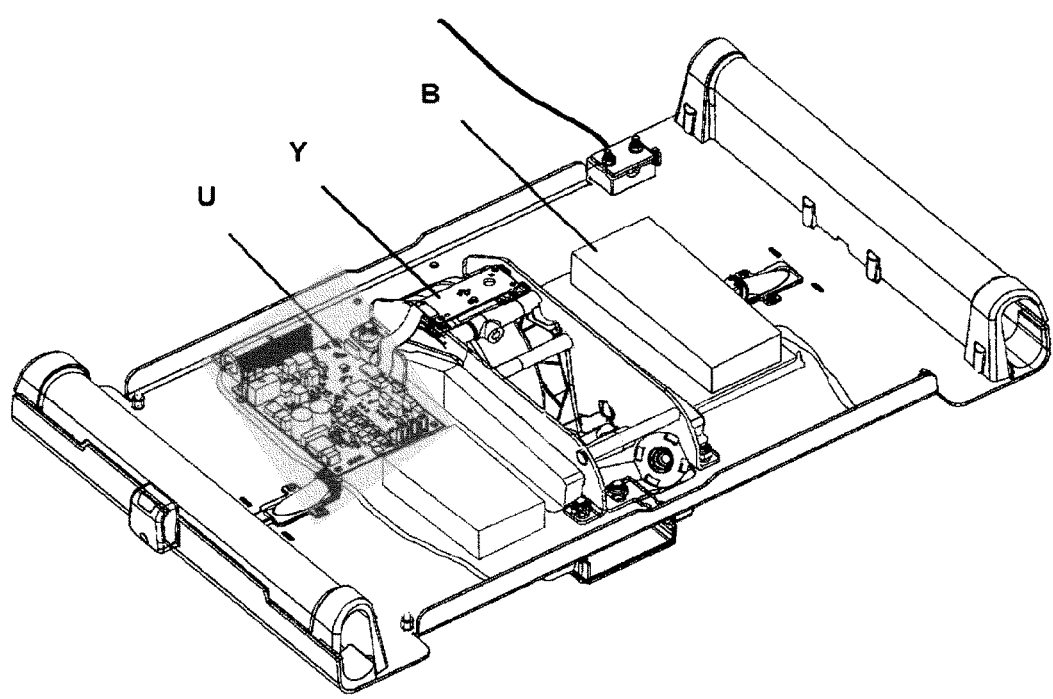
FIG. 1B is an exemplary diagram of the control unit and sensor(s) of the brake assist system of FIG. 1A.

Referring to FIGS. 1A-1B, a mobile patient handling equipment, such as a bed, stretcher or patient lift, includes a chassis 4 connected to a plurality of castors W, of which there may be at least three castors W supporting and enabling transport of the mobile patient handling equipment. In an exemplary embodiment, there are four castors W, one at each corner of the chassis 4. The castors contact the ground 9 and have rolling and swiveling properties to allow a user to move the mobile patient handling equipment and its payload L1. The payload L1 is representative of the mass which makes up the bed, stretcher or patient lift, goods to be supported and/or a patient supported on the mobile patient handling equipment, including compartments, holders and other supplementary components often provided in patient handling equipment.

A brake assistance assembly and system 1 may be coupled to and operatively associated with a portion of chassis 4. Brake assistance assembly 1 may include a wheel 5, a brake device M, one or more sensors Y and a control unit U operatively associated with the brake device M and the one or more sensors Y. Optionally, a power source B may be connected to braking device M, sensors Y and/or control unit U.

In FIG. 1A, wheel 5 is an additional or supplemental 5th wheel, centrally positioned on wheel chassis 4 of the mobile patient handling equipment. An exterior surface of wheel 5, e.g. the tire of wheel 5, has frictional properties for gripping and applying force to ground 9. For example the exterior surface of wheel 5 may be rubberized, include treads or other suitable surface to provide a good grip with the ground 9 when pressed against the ground. In the embodiment of FIG. 1, wheel 5 is pressed against the ground by a resilient link 11 of a drive assembly 10 which connects the wheel 5 to the chassis 4. Although FIG. 1 shows an exemplary arrangement in which one or several of the payload supporting castors W and wheel 5 are operatively associated with brake device M, other steering or drive systems that provide brake assistance to mobile patient handling equipment are envisaged including, for example, a wheel drive mechanism including a chassis with castors W and wheel 5, a motor operably coupled to drive and brake wheel 5, a spring assembly applying a force to wheel 5 to contact ground 9 and a system for lifting and deploying wheel 5, such as disclosed in applicant's co-pending patent application entitled, "Wheel Drive Mechanism For Patient Handling Equipment," herein incorporated by reference in its entirety.

Figure 2A:
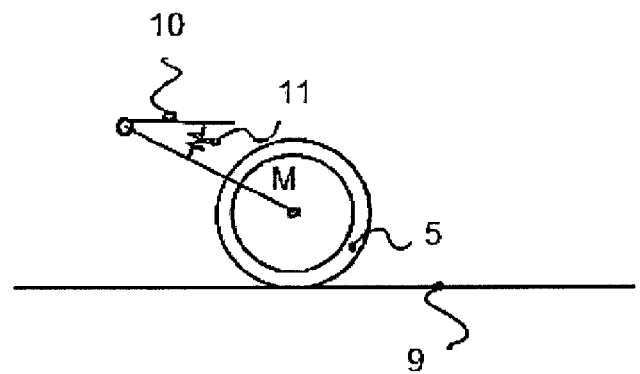
FIG. 2A is a schematic diagram depicting an embodiment of brake assist system applied to a 5th wheel of the patient trolley of FIG. 1.

Referring to FIG. 2A, in one embodiment the brake device M is in the form of a motor which is able to assist in the propulsion of the equipment 10 when energized and is also able to assist in the deceleration of the equipment 10 when required. An exemplary brake device M is a DC-motor energized from a power source B such as a battery. The power applied may be proportional to the speed to be achieved, dictated by a control system or unit U.

In some embodiments, as shown in 2B, the motor can optionally also be used as a generator, such that when the motor is rotated as a result of the equipment being rolled on the ground, electromagnetic energy generated by the motor is fed into the control system U. The generated power would be proportional to the speed of rotation and as such indicative of the speed of the system. The polarity of the generated voltage would be determined by the direction of travel of the chassis 4 and specifically of the wheel 5, though this may be switched by appropriate electronics.

By closing the switch C1, resistor R1 becomes connected in parallel with the motor configured brake device M, resulting in an increase in the power, or current, required to rotate it, in proportion to the resistance of the resistor R1. A lower resistance results in a higher power required. By altering the resistance, the braking assistance added to the system by the brake device M can be controlled. One way of realizing this is by means of a resistance R1 of low resistance and momentarily connecting this across the motor by closing and opening the switch C1 periodically. The frequency of the periodic switching of switch C1 stands in proportion to the brake assistance the brake device M adds to the system. The switching frequency can be determined by control system U, for example on the basis of one of more input signals, speed of movement of the chassis 4 being one. The desired output is reflected in the frequency at which the control system U switches, via link UC1, the switch C1 open and closed.

The speed of the mobile patient handling equipment can be determined in a variety of ways including, for example, Doppler radar, optical encoders, micro-switches, reed-switches and magnets, hall sensors, image processing, and so on. These are just some examples of determining speed and direction of travel for wheeled equipment.

The computational and electrical control abilities of control system U may be realized by having the motor configured brake device M energize the control system U, making the battery or other power source redundant.

The exemplary DC-motor, may be replaced by other types of motors, such as for example a brushless DC-motor, an alternating current motor, a servo motor or any other motor suitable for use in hospital or elderly care equipment and environments. Such motors would give the same indicative measurements as previously described for the DC-motor. They would also have the ability to serve as generators feeding the control system U with power.

Figure 2B:
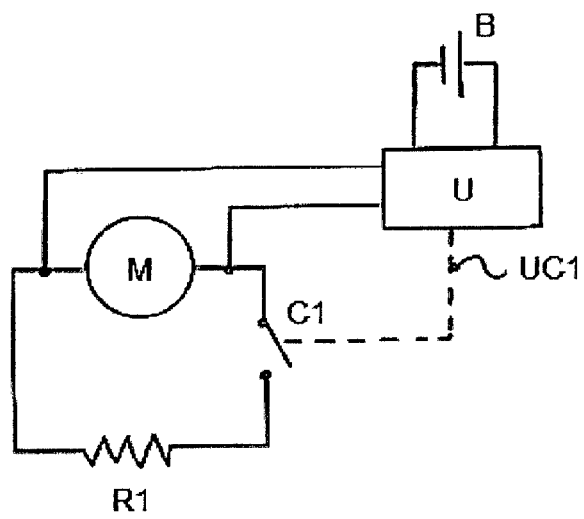
FIG. 2B is a circuit diagram of the brake assist system of FIG. 2A.
Figure 3:
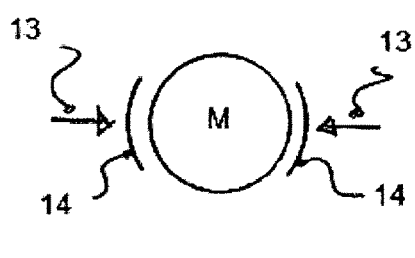
FIG. 3 is a schematic diagram depicting another embodiment of brake assist system applied to a 5th wheel of the patient trolley of FIG. 1.

Referring now to FIG. 3, another embodiment of brake device M is illustrated. In this embodiment, a brake assembly is controlled by a processing unit in other ways than by effectively short circuiting a motor as in the embodiment of FIG. 2. In the embodiment of FIG. 3, the output of a motor configured brake device M is tempered by one or more brake pads 14, wherein the force 13 acting upon the brake pad or pads 14 controls the torque required to rotate the brake device M.

Figure 4:
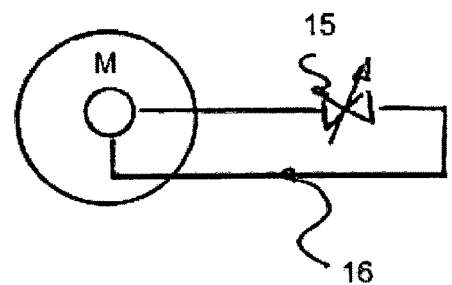
FIG. 4 is a schematic diagram depicting another embodiment of brake assist system applied to a 5th wheel of the patient trolley of FIG. 1.

FIG. 4 shows another embodiment in which the applied force of brake device M is controlled by, corresponds to and/or may be proportional to the opening or closing of a valve 15 which is part of a hydraulic circuit 16 used to control the torque required to rotate the brake device M.

Brake assistance system further includes one or more sensors Y operatively associated with the control unit U to assess and determine an appropriate amount of braking force to be applied to brake device M and/or wheel 5. Exemplary sensors may include battery voltage sensors; voltage, current and/or temperature sensors for the system and/or brake device; velocity and/or acceleration sensors; directional sensors and/or angle sensors or any combination thereof. Battery voltage sensors may be used to assess the remaining system capacity as well as conserve and/or uniformly distribute power as needed for braking. System and/or brake device voltage, current and/or temperature sensors function to assess system capacity as well as ensure safe operation of the braking assistance system. Velocity sensors, acceleration sensors, directional sensors and/or angle sensors may assist in assessing the current status of the patient handling equipment, estimating a forecasted need for braking assistance and determine an applicable braking force to be applied. In one embodiment, braking assistance system 1 may include at least one gyroscope for determining angular velocity and/or acceleration of the patient handling equipment and at least one accelerometer for determine whether the patient handling equipment is being moved down slope as well as the angle of the slope. System 1 may include an optional second accelerometer to confirm the slope of inclination.

Figure 5:
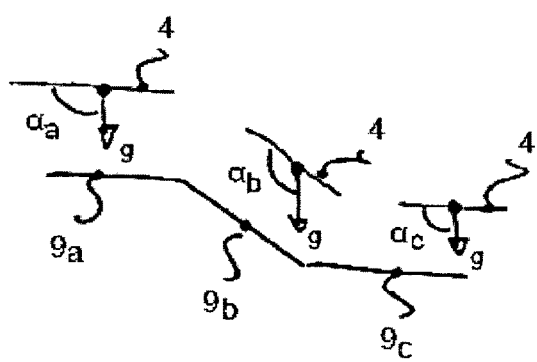
FIG. 5 is a schematic diagram depicting the principles for operation of a system including an angle detection sensor over a ground surface having different slope angles.

Referring now to FIG. 5 which provides an exemplary illustration of the operation of an accelerometer and gyroscope sensor, in operation chassis 4 is shown parallel to the flat ground surface 9a. The gravitational force g is at an angle αa relative to the chassis 4 of about 90 degrees when the ground 9a is horizontal. The angle αb of the direction of gravitational force is greater than αa when the chassis 4 of the mobile patient handling equipment is on a slope 9b. Knowledge of this angle α would be beneficial for the processing unit U to determine the required braking force to be applied by the brake device M in order to achieve the desired speed of movement of the equipment. The angle α could be determined from a variety of devices, such as 1-, 2- or 3-axis MEMS-accelerometers, available from manufacturers such as Freescale™. When combined with a gyroscope, also available from manufacturers such as Freescale™, an estimation of the angle α can be reliably determined at different system speeds. Moreover, the estimate of the angle α can be improved by filtering the combined signals from the accelerometer and gyroscope through in a Kalman filter, a Complementary Filter or any other suitable filter which enhances the precision of the estimate of the angle α during dynamic behavior of the equipment.

Figure 6:
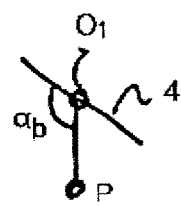
FIG. 6 is a schematic diagram showing an embodiment of angle detection device.

In other embodiments, angle estimation may be achieved by other means, with one example being shown in FIG. 6. An angle detection device of this embodiment may include a pendulum P coupled to an optical encoder O1 providing an encoder signal proportional to the pendulum angle αb in relation to the chassis 4. The optical encoder O1 may also be replaced by an electrical potentiometer giving the same result.

Figure 7:
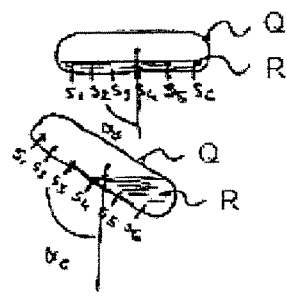
FIG. 7 is a schematic diagram of another embodiment of angle detection device.

Another embodiment of an angle estimating device is shown in FIG. 7, which includes a container Q holding a liquid R characterized in being detectable by a plurality of detectors S1-S6. The number and position of the detectors S1-S6 which is activated by the liquid R gives an indication of the angle αd and αe at which the container Q is disposed. When the container Q is fixed in parallel with the plane of the chassis 4, the angle detecting device will give an indication directly related to the angle of the chassis 4 and as a result of the ground 9.

Any other available angle estimation device may serve as an input signal to the control system U, as long as the angle estimation reflects the angle of ground 9a, 9b, 9c relative the horizontal.

Figure 8:
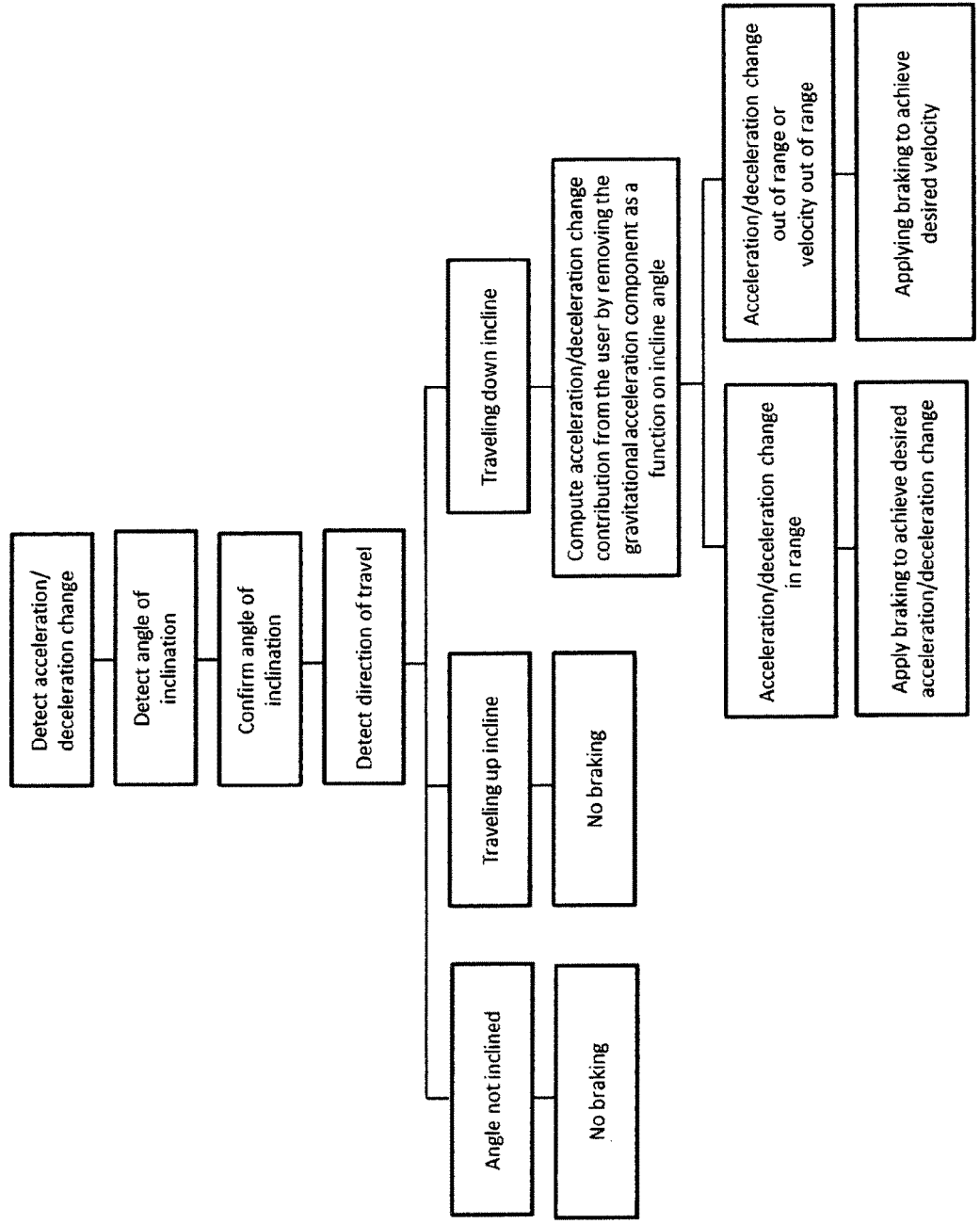
FIG. 8 depicts a flow chart showing braking assistance assessments and determinations made by a control system.

FIG. 8 shows an exemplary flow chart and in which information obtained from a gyroscope as well as a primary accelerometer and an auxiliary accelerometer are used by the control unit U to calculate and determine whether and the amount of braking force to be applied by brake device M.

Based on the information provided by various sensors Y, the control unit U may be able to: assess the transport status of the patient handling equipment, the environmental conditions affecting the mobility of the patient handling equipment and/or the capacity of the drive and braking system; determine whether there is a need for braking assistance and amount of force to be applied; and deploy a suitable amount of braking force to brake device M and/or wheel 5. Upon determining braking assistance is desired and the amount of braking force appropriate under the circumstance, the control unit U may issue a signal to brake device M and/or wheel 5 to reduce the speed of the patient transport equipment. For example, the control unit U may instruct a motor and or wheel 5 to decrease its speed. In one embodiment, based on the input from the system sensors Y and calculation of the system algorithm, the control unit U may issue a signal to deliver a braking force equal to the amount of force introduced to the patient handling equipment system beyond a pre-established and/or predetermined steady state of movement to achieve equilibrium of the system. In another embodiment, the control unit U may instruct application of a brake force greater than zero but less than the present velocity of the patient handling equipment so that the velocity of the patient handling equipment does not exceed a predetermined target rate and/or so that an acceleration of the patient handling equipment does not exceed a predetermined rate In an exemplary embodiment, the control unit U may calculate the acceleration and/or deceleration contribution from a user by subtracting the gravitational force from the measured acceleration as a function of the inclination angle, where [user contribution acceleration/deceleration] $=a-g*\sin\phi+\mu*g*\cos\phi$, where g is the gravitational force set to 9.81 m/s$^2$, μ being a set factor between 0 and 1 reflecting the system rolling resistance, φ being the incline angle and a being the acceleration measured by the system at the time of computation. The system may then maintain the acceleration within a predetermined range, e.g. of about +0.1 m/s$^2$ and about −1 m/s$^2$ when traveling down an incline, responding to the contribution from the user as previously described by applying a braking force to the system proportional to the rate of acceleration change computed. As the acceleration changes affect the resulting velocity of the patient handling equipment and the velocity may have an upper limit, e.g. in the range of about 0.8-1.7 m/s, the system may at the upper velocity limit apply varying braking to maintain the velocity at the upper limit with a deviation of about +/−0.1 m/s.

In the exemplary flow chart of FIG. 8, a method for using the brake assist system may include detecting a change in acceleration or deceleration, detecting an angle of inclination, confirming an angle of inclination, and detecting direction of travel via system sensors Y operatively coupled to a control unit U. When no angle of inclination is detected or when the sensors Y determine that the patient handling system is traveling up an incline the control unit U determines that no brake assistance is needed and does not apply any braking force. When the sensors Y detect the patient handling system is traveling down an incline, the control unit U functions to compute acceleration and/or deceleration change contribution from the user by removing the gravitational acceleration component as a function of the incline angle. When the determined acceleration or deceleration change is within a predetermined range, the control unit U may instruct the braking device to apply a braking force to achieve a target acceleration/deceleration change. When the determined acceleration change or when a detected velocity is out of range, the control unit U may instruct the braking device to apply a braking force to achieve a target velocity.

Once the braking assistance system 1 is activated, which may be accomplished by, for example, releasing a brake bar so that wheel 5 is deployed and engages ground G1, the system will automatically detect when braking assistance is required and provide assistance as needed to the user without requiring the user issue commands or otherwise issue instructions through a user interface. Instead, braking assistance is automated such that a care giver can maneuver the patient handling equipment as one would normally without any special, additional or new procedure. The braking assistance system 1 will be active as long as wheel 5 is lowered and in contact with ground G1.

Figure 9:
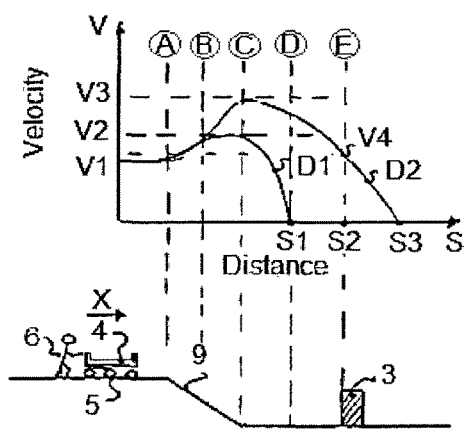
FIG. 9 depicts exemplary operating characteristics of a system taught herein compared to conventional systems without a brake assistance system when travelling down a slope.

Referring now to FIG. 9, the principles of operation of the system taught herein are shown in the distance to speed graphs of this Figure. Curve D2 represents the wheeled chassis 4 of a mobile patient handling equipment pushed in direction X by a user 6 over a surface 9 having different angles, in this example commencing on the horizontal, transitioning to a downward slope and levelling out again to a horizontal surface. At the start, the chassis 4 has a speed of V1. If the user 6 lets go of the chassis 4 when reaching the downward slope at point A, the chassis 4 will accelerate to a higher speed V3 as it travels down the slope, whereas at the end of the slope at point C, the equipment will start to decelerate as there is no more downward slope to gain speed and the effects of friction will take over. This can be seen in curve 2, which drops towards zero speed from point C.

The patient handling equipment would reach a standstill in normal circumstances, that is with no obstacles in the way, once its speed reaches zero, at position S3. If, on the other hand, there is an obstacle such as block 3, positioned before the end of normal travel of the patient handling equipment, it will hit the obstacle 3 at speed V4, with the force of the impact being related to the mass of the equipment and its speed.

If the patient handling equipment is provided with a brake assistance arrangement 1 as taught herein, the same patient handling equipment with the same payload would now follow a speed/distance curve D1 as shown in FIG. 9. As can be seen, the maximum velocity reached on the downward slope is V2, wherein V2 is lower than V3. The patient handling equipment would also come to a standstill on the horizontal ground at position S1, which is significantly less than/located before position S3. In practice, and as will be apparent from the teachings above, when a downward slope is detected by the control unit U, the control unit directs the brake device M to limit the speed reached so as to not to exceed a given threshold V2. In order for the user 6 to comfortably direct the patient handling equipment downward the slope 9 at the lower speed than V2, the control unit U also sets a limit in the acceleration that the brake device M will allow, thus allowing the user 6 pass down the slope with a variable speed between 0 and V2 and while maintaining reasonable control over the patient handling equipment. This is achieved by controlling the amount, duration and/or frequency of applied braking force which is determined based on information obtained from various system sensors Y, such as system accelerometers and gyroscopes. The application of the braking force via the control unit U, for instance the magnitude, frequency and duration over which the switch C1 is opened and closed, or the frequency and duration of application of the brakes pads 14 or of the hydraulic brake 15, function to regulate and control movement of the patient handling equipment down the slope and ensure it comes to stop at S1. FIG. 9 shows a corresponding graph illustrating when and the amount of braking force applied to the system. When the sensors Y detect movement of the patient handling system down slope and an increase in angular velocity as the equipment moves down slope, the control unit U applies a breaking force in an amount that does not exceed the velocity of the patient handling equipment, allowing the equipment to continue moving down slope but at a checked and regulated speed. Once the system no longer detects the presence of a downward slope and acceleration of the patient handling equipment in excess of a predetermined/normal range, no further braking force is applied by braking device M.

Figure 10:
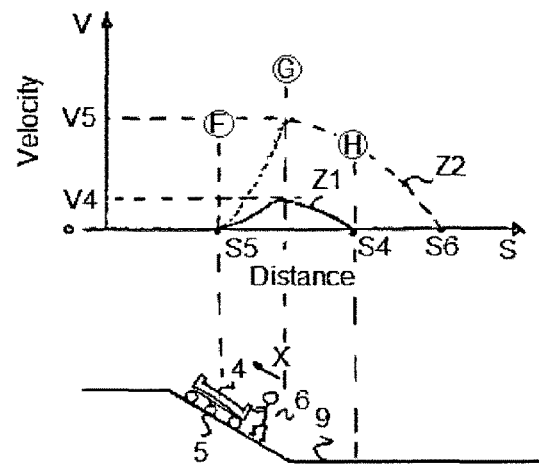
FIG. 10 depicts exemplary operating characteristics of a system taught herein compared to conventional systems without a brake assistance system when traveling up a slope.

Referring now to FIG. 10, a patient handling equipment such as a trolley, bed or patient lift, having the brake assistance assembly 1 taught herein, is shown being pushed up a slope 9 by a user 6 in direction X. When the user reaches point S5, the patient handling equipment is shown coming to a halt. Were the user 6 to let go of the patient handling equipment, this will then roll down the slope reaching a max speed of V4, before coming to the horizontal ground section, whereupon it will decelerate back to zero, coming to a halt at point S4, all represented in Curve Z1. The same scenario without any brake assistance arrangement 5 would typically follow the speed versus distance Curve Z2. V4 would be lower than V2 since the control unit U also has the initial speed as an input which it will take into account when setting the maximum velocity.

No brake is applied when travelling upward the slope. In contrast, upon detection by the control unit U that the patient handling equipment is moving up a slope, the wheel drive mechanism may provide propulsion assistance to a user, as described in Applicant's co-pending application, International Patent Application Publication no. WO 2014/187864, herein incorporated by reference in its entirety.

In one embodiment, for safety purposes the braking assistance system does not attempt or function to set the maximum speed to zero. That is, the system will allow equipment 4 to roll down a slope at a controlled speed, thereby reminding the user 6 to apply the parking brake/s of the equipment if the user intends to leave the equipment stationary on a slope.

The apparatus can also be provided with an additional safety feature in connection with any equipment which allows retraction (rising) of the fifth wheel 5, which would in practice cause the braking wheel 5 to become disengaged from the ground surface. The additional safety feature is a function in the control unit U which allows retraction, lifting of the fifth wheel only when it is detected that the patient handling equipment is on a horizontal surface (by any of the tilt detection devices disclosed herein). The skilled person will appreciate that the system may allow for a slight variation form the horizontal, for example of about +/−1.5 degree.

Further functionalities could be added to the system for the convenience of the user. In one example, if the user wishes to disengage the brake assistance arrangement on a slope, the control unit U could allow this to occur, for instance if it has received data indicating that the speed of travel of the equipment has been below a given threshold for a given period, such stationary or close to stationary for at least about 3 seconds.

The mention of application to a bed or trolley is not intended to restrict the usage of the teachings herein to these platforms. The teachings herein could be applied to many other types of movable equipment, such as linen carts, food trolleys, mobile x-ray machines or similar equipment frequently used in a hospital or elderly care equipment or environments.

It will be appreciated that although the exemplary embodiments described herein incorporate the brake assist system into a driven wheel assembly, other embodiments could use elements of the brake assist system with a non-driven wheel, in which case the brake assistance system 1 will apply, via the control unit U variable braking on the wheel.

The skilled person will be able to identify readily suitable sensors for measuring speed of the equipment for use by the control unit U in its determination of how to apply the braking assist function as described above.

The invention claimed is:

1. A brake assist system for mobile patient handling equipment, the brake assist system comprising:
   at least one wheel;
   at least one brake operatively associated with the at least one wheel;
   at least one sensor for detecting a status of the mobile patient handling equipment; and
   a control unit operatively associated with the at least one sensor and the at least one brake;
   wherein the control unit is configured to engage the at least one brake in a partial braking mode when the mobile patient handling equipment at least one of: moves down a slope; exceeds a predetermined velocity; and exceeds a predetermined acceleration, wherein the control unit engages the partial braking mode based on a calculation of speed and applies an amount of braking to maintain speed and/or acceleration of the patient handling equipment within a predetermined range, and wherein the partial braking mode allows the mobile patient handling equipment to continue moving.

2. A brake assist system for mobile patient handling equipment, the brake assist system comprising:
   at least one wheel;
   at least one brake operatively associated with the at least one wheel;
   a control unit operatively associated with the brake;
   a tilt sensor operable to detect tilt of the mobile patient handling equipment, the tilt sensor being connected to the control unit;
   wherein the control unit is configured to engage the at least one brake in a partial braking mode when the tilt sensor senses the mobile patient handling equipment is on a downward slope, wherein the control unit engages the partial braking mode based on a calculation of acceleration attributable to a user of the mobile patient handling equipment and applies an amount of braking to maintain acceleration or deceleration of the patient handling equipment, based on the acceleration attributable to the user, within a predetermined range, and wherein the partial braking mode allows the mobile patient handling equipment to move down said slope.

3. The brake assist system according to claim 1, wherein the control unit is configured to engage the at least one brake in a cyclical manner to effect the partial braking mode.

4. The brake assist system according to claim 3, wherein the control unit is configured to adjust a duty cycle of the partial braking mode so as to adjust the amount of braking force applied to the mobile patient handling equipment.

5. The brake assist system according to claim 3, wherein the control unit is configured to adjust a duration of the partial braking mode so as to adjust the amount of braking force applied to the mobile patient handling equipment.

6. The brake assist system according to claim 1, including a speed sensor connected to the control unit, wherein the control unit is configured to adjust the partial braking mode on the basis of rotation of a wheel of the mobile patient handling equipment.

7. The brake assist system according to claim 1, wherein the control unit is configured to adjust the partial braking mode so as to limit the speed of the mobile patient handling equipment.

8. The brake assist system according to claim 1, wherein the wheel includes a fixed angle steering or braking wheel.

9. The brake assist system according to claim 1, wherein the wheel includes a driven wheel.

10. The brake assist system according to claim 9, wherein the brake alters a driving function of the driven wheel.

11. The brake assist system according to claim 9, wherein the brake includes a switchable bypass circuit connected across a drive motor of the driven wheel, the control unit being operable to control switching of the bypass circuit, wherein the bypass circuit is operable to reduce current flow to the drive motor.

12. The brake assist system according to claim 11, wherein the switchable bypass circuit includes a low resistance bypass path.

13. The brake assist system according to claim 9, wherein the brake includes one or more brake pads actuatable by the control unit, wherein each brake pad is controllable to apply an adjustable braking force on the driven wheel.

14. The brake assist system according to claim 9, wherein the brake includes a hydraulic brake device coupled to the driven wheel and to the control unit, the control unit being operable to adjust the amount of hydraulic braking applied to the drive wheel.

15. The brake assist system according to claim 2, wherein the tilt sensor is a pendulum sensor, connected to the mobile patient handling equipment.

16. The brake assist system according to claim 2, wherein the tilt sensor is a fluidic sensor providing a series of tilt angle indicators.

17. The brake assist system according to claim 2, wherein the tilt sensor includes an accelerometer.

18. The brake assist system according to claim 1, wherein the wheel is retractable.

19. The brake assist system according to claim 18, wherein the control unit is operable to command retraction of the wheel when it is sensed that the mobile patient handling equipment is horizontal or at an angle of tilt below a threshold.

20. The brake assist system according to claim 1, wherein the mobile patient handling equipment is a medical device.

21. The brake assist system according to claim 1, wherein the mobile equipment is a patient lifting device.

22. The brake assist system according to claim 1, wherein the mobile equipment is a medical bed or trolley.

23. A method for using the brake assist system of claim 1, the method comprising: detecting, via the at least one sensor, a change in an angle of inclination of a surface supporting the mobile patient handling equipment; and applying, via the control unit and the brake, an amount of braking sufficient to maintain speed and/or acceleration of the patient handling equipment within the predetermined range.

24. The method of claim 23, further comprising detecting, via the at least one sensor, a change in acceleration or deceleration of the mobile patient handling equipment and a direction of the mobile patient handling equipment.

25. The method of claim 23, wherein the brake assist system automatically applies a braking force when it detects the mobile patient handling system is traveling down an incline,
wherein the applied braking force allows the mobile patient handling equipment to move down the incline.

26. The method of claim 25, wherein the brake assist system automatically applies said braking force when it detects the mobile patient handling equipment is traveling down an incline in conjunction with at least one of: a change in acceleration of the patient handling equipment exceeding a predetermined range or a detected velocity of the patient handling equipment exceeding a predetermined range,
wherein the applied braking force allows the patient handling equipment to move down the incline.

27. The method of claim 25, wherein the brake assist system automatically applies said braking force when it detects the mobile patient handling equipment is traveling down an incline and when a change in acceleration or deceleration of the patient handling equipment is within a predetermined range,
wherein the applied braking force allows the patient handling equipment to move down the incline.

* * * * *